July 7, 1970  E. C. AMBLER ET AL  3,519,863
COMMUTATOR LEAD MOUNTING
Filed Jan. 2, 1969
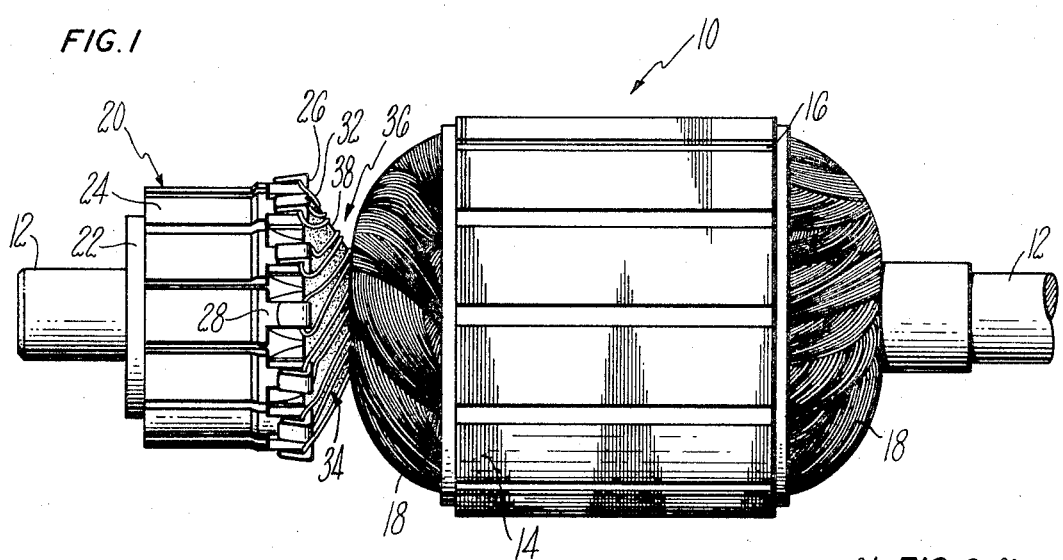
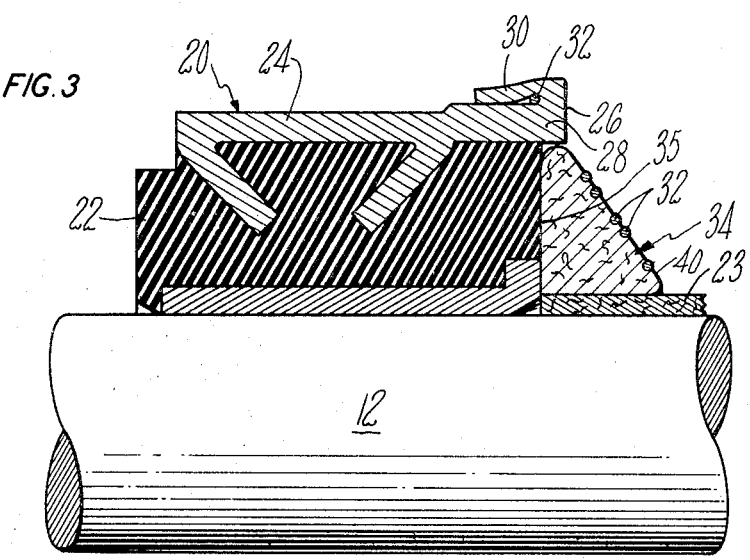
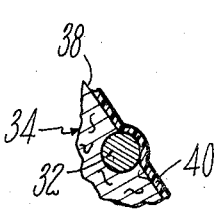
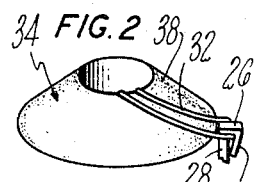
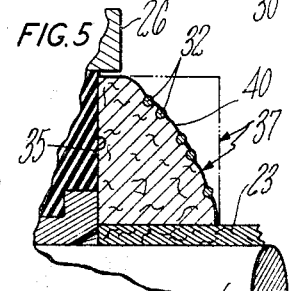
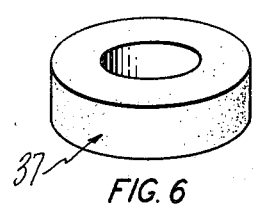
INVENTORS
E. CURTIS AMBLER
WILLIAM J. CONLON
BY
*Lindsey, Prutzman and Hayes*
ATTORNEY United States Patent Office 3,519,863
Patented July 7, 1970

3,519,863
COMMUTATOR LEAD MOUNTING
Edward Curtis Ambler, Newington, and William J. Conlon, New Britain, Conn., assignors to The Stanley Works, New Britain, Conn., a corporation of Connecticut
Filed Jan. 2, 1969, Ser. No. 788,383
Int. Cl. H02k
U.S. Cl. 310—234                    9 Claims

ABSTRACT OF THE DISCLOSURE

An armature having a conventional laminated core and commutator and a felt washer deformable during winding mounted on the armature shaft between the commutator and core and supporting the electrical leads interconnecting the commutator segments and armature coils. The armature coils are wound with a flier that periodically loops the winding about end hooks of successive commutator segments to form taut commutator leads partially embedded in the felt washer along substantially their entire length, and varnish is applied to harden the deformed washer in conical configuration caused by the partially embedded commutator leads and to adhere the partially embedded commutator leads to the washer.

BRIEF DESCRIPTION OF THE INVENTION

The present invention generally relates to improvements in dynamoelectric machine armatures and more particularly to a new and improved method and arrangement for mounting the armature commutator leads that electrically connect the armature coils to the armature commutator segments.

It is a principal aim of the present invention to provide a new and improved method and arrangement for mounting armature commutator leads which provides for automatically connecting the commutator leads to the commutator segments during the armature winding operation, and which provides improved lead support and minimizes lead fatigue due to vibrational, centrifugal and electromagnetic forces during operation of the dynamoelectric machine.

It is another aim of the present invention to provide a method and arrangement for mounting and supporting commutator leads for facilitating automatically connecting the commutator leads to the commutator segments with uniform lead tension.

It is a further aim of the present invention to provide a new and improved method and arrangement for mounting armature commutator leads which is adapted for efficient mass production methods, which is economical in design, and which provides a quality product providing long maintenance-free service.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

BRIEF DESCRIPTION OF THE DRAWING

In the drawing:

FIG. 1 is a longitudinal view, partly broken away, of an armature incorporating an embodiment of the commutator lead mounting of the present invention;

FIG. 2 is a reduced isometric view, partly broken away, showing a pair of commutator leads and a supporting washer of the armature;

FIG. 3 is an enlarged partial longitudinal section view, partly broken away and partly in section, showing the commutator lead mounting of the armature;

FIG. 4 is a enlargement, partly broken away and partly in section, of a portion of FIG. 3 showing the commutator lead mounting in more detail;

FIG. 5 is an enlarged section view similar to FIG. 3, and fragmented, of alternative commutator lead mounting; and FIG. 6 is a reduced isometric view similar to FIG. 2, of an alternative lead support.

DESCRIPTION OF THE PREFERRED EMBODIMENT

Referring now to the drawings in greater detail wherein like reference numerals indicate like parts throughout the several figures, a dynamoelectric machine armature 10 incorporating an embodiment of the commutator lead mounting of the present invention is shown comprising a shaft 12, a conventional laminated armature core 14 having a plurality of circumferentially spaced axially extending slots 16 for receiving the usual armature coils 18, and a commutator 20 mounted on one end of the shaft 12 having a plurality of circumferentially spaced commutator segments 24 mounted on an insulating spool 22. An insulating spacer sleeve 23 is mounted on the shaft 12 between the core 14 and the commutator 20, and the commutator segments 24 have hook portions 26 at their inner axial ends 28 for connecting the armature coils 18 to the commutator segments 24. Each such hook is shown including a deformable leg 30 for facilitating closing the hook after the commutator lead 32 has been placed therein. This arrangement of structure facilitates winding the armature and connecting the armature coils to the commutator segments 24 fully automatically during the winding operation, as for example, as described in U.S. Pat. No. 3,395,448, dated Aug. 6, 1968, of Harry W. Moore entitled "Armature Winding and Lead Wire Connecting Method," to provide commutator leads 32 with relatively uniform tension. And, after the armature is wound, the usual winding insulation may be removed from the commutator leads to ensure a good electrical connection with the commutator segments, such as by soldering or hotstaking.

With the use of uniformly taut leads 32, the present invention provides lead support means in the form of a conical washer 34 made of felt or other resilient and absorbent material. This washer is mounted on the insulating sleeve 23 adjacent the commutator 20 so that it fits snugly against a recessed end face 35 of the spool 22 to provide a resilient sloping surface 38 in the gap 36 between the commutator 20 and the armature coils 18. The sloping conical surface of the washer 34 substantially so coincides with the slope of the taut leads 32 that the leads will be partially embedded in the conical surface of the washer 34 when the armature is wound. Inasmuch as the washer 34 fits snugly between the coils 18 and the spool 22, and the hook portions 26 slightly overlie the washer 34 and lie substantially in the conical envelope of the surface of the washer, the leads 32 are substantially uniformly partially embedded in the washer along substantially their full length, whereby the taut leads are uniformly supported between the coils 18 and the commutator 20.

Instead of the conical washer 34, a parallel face washer 37, FIG. 6, may be used as the lead support means. The completed support, however, remains generally conical, see FIG. 5. To obtain this configuration, the leads 32 deform the exposed face of the washer 37 during armature winding to a greater extent than occurs with the washer 34, as suggested by the phantom lines of FIG. 5. The washer 37 thereby affords increased support for each lead along its line of contact with the washer. As with the washer 34, the leads 32 are substantially uniformly partially embedded in the washer along substantially their full length, thereby being uniformly supported between the coils 18 and the commutator 20.

After completion of armature winding and lead connecting, varnish or other suitable combination hardening, coating and adherent material 40 is applied to the leads 32 and to the washer 34 to rigidify the washer in its deformed condition caused by the partially embedded commutator leads and to adhere the leads to the washer, and which together provide for securely supporting the leads against the dynamic and electromagnetic forces occurring during the operation of the motor. As a result, the commutator leads remain secured in position to minimize movement of the commutator leads and thereby minimize lead fatigue.

The invention thus provides an improved method and arrangement for mounting, supporting and securing commutator leads. All leads are substantially uniformly taut and supported in position along substantially their full length, and are rigidly secured in that position against dynamic and electromagnetic forces.

As will be apparent to persons skilled in the art, various modifications and adaptations of the structure above-described will become readily apparent without departure from the spirit and scope of the invention, the scope of which is defined in the appended claims.

We claim:

1. A dynamoelectric armature comprising a shaft, an armature core mounted on the shaft having axially extending slots therein, a commutator mounted on the shaft spaced from the core having a plurality of circumferentially spaced commutator segments each having a hook portion at the inner axial end thereof, a circular washer of resilient and absorbent material mounted on the shaft closely adjacent the commutator between the commutator and core, an armature winding forming armature coils received in the core slots and looped about the hook portions to form taut commutator leads intermediate the hook portions and armature coils and partially embedded in the resilient washer, and a combined hardener and adhesive material absorbed by the washer for hardening the washer with the leads partially embedded therein and for adhering the leads to the washer.

2. The dynamoelectric armature of claim 1 wherein the washer is formed of felt.

3. The dynamoelectric armature of claim 1 wherein the washer extends between the armature coils and the commutator segment hook portions to provide support for the commutator leads along substantially their full length.

4. The dynamoelectric armature of claim 1 wherein the washer has a conical external surface inclined inwardly from the commutator segments and wherein the commutator leads extend generally spirally about the conical washer from the coil windings to the commutator segments.

5. The dynamoelectric armature of claim 4 wherein the commutator leads and the conical surface of the washer coincide substantially continuously from the armature windings to the segment hook portions so that the leads are partially embedded in and supported by the washer along substantailly their full length.

6. The dynamoelectric armature of claim 5 wherein the commutator comprises an insulating spool on the armature shaft supporting the angularly spaced commutator segments with the segments extending slightly axially inwardly of the spool, wherein the washer is mounted against the spool, in part radially inwardly of the axial extensions of the commutator segments, and wherein the hook portions retain the leads radially outwardly from the washer in the envelope of the conical surface of the washer whereby the commutator leads are generally uniformly stressed along substantially their full length, in addition to being partially embedded in, supported by, and secured to the washer therealong.

7. A method of mounting and supporting and securing commutator leads of a dynamoelectric armature having an armature core with slots therein, a commutator spaced from the core having commutator segments with connector hooks at the inner ends thereof, and an armature winding forming armature coils received within the slots and looped about the commutator connector hoks to form taut commutator leads between the armature coils and commutator segments, comprising the steps of providing a circular washer of resilient and absorbent material about the shaft intermediate the commutator and core and contoured to partially embed the taut commutator leads as the armature winding is looped about the commutator connector hooks, and applying a combined hardening and adhering agent to the washer and commutator leads to adhere the taut commutator leads to the washer and harden the washer with the commutator leads partially embedded therein.

8. The method of mounting and supporting and securing commutator leads set forth in claim 7 further comprising the step of winding the armature with a flier to form both the armature coils and the commutator leads and applying the commutator leads with the flier along substantially their full length onto the resilient washer to embed the leads partially therein, so that the commutator leads are uniformly rigidly secured against movement by the deformed washer.

9. The dynamoelectric armature of claim 1 wherein the washer is of the parallel face type having one face exposed to the being-looped leads and deformable thereby during winding to a conical configuration inclined inwardly from the commutator segments and coinciding substantially with those leads continuously from the armature windings to the segment hook portions so that the leads are partially embedded in and supported by the washer along substantially their full length.

References Cited

UNITED STATES PATENTS

| | | | |
|---|---|---|---|
| 1,793,986 | 2/1931 | Apple | 310—233 |
| 2,188,170 | 1/1940 | Zschau | 171—206 |
| 2,535,825 | 12/1950 | Wahlberg | 29—597 |
| 2,897,385 | 7/1959 | Powell | 310—234 |
| 3,213,307 | 10/1965 | Summerfield | 310—234 |

WARREN E. RAY, Primary Examiner

L. L. SMITH, Assistant Examiner

U.S. Cl. X.R.

29—597